United States Patent [19]

Miyashita et al.

[11] Patent Number: 5,557,295

[45] Date of Patent: Sep. 17, 1996

[54] DISPLAY PANEL

[75] Inventors: Sadamasa Miyashita; Laiying Zhang, both of Nagaoka, Japan

[73] Assignee: Nippon Seiki K.K., Niigata-ken, Japan

[21] Appl. No.: 972,681

[22] Filed: Nov. 6, 1992

[30] Foreign Application Priority Data

| Nov. 28, 1991 | [JP] | Japan | 3-339884 |
| Oct. 9, 1992 | [JP] | Japan | 4-297716 |

[51] Int. Cl.$^6$ ............................................. G09G 3/12
[52] U.S. Cl. ............................ 345/36; 345/43; 359/48; 313/509
[58] Field of Search ............................ 340/784, 781, 340/815.15; 345/36, 43; 313/509; 428/31; 359/48, 54, 68, 89, 98

[56] References Cited

U.S. PATENT DOCUMENTS

| 4,318,953 | 3/1982 | Smith et al. | 428/200 |
| 4,541,692 | 9/1985 | Collins et al. | 359/48 |
| 4,603,065 | 7/1986 | Mori et al. | 428/31 |
| 4,878,387 | 11/1989 | Muramatsu . | |
| 5,036,249 | 7/1991 | Pike-Biegunski et al. . | |
| 5,047,761 | 9/1991 | Sell . | |
| 5,063,379 | 11/1991 | Fabry et al. | 340/784 |

FOREIGN PATENT DOCUMENTS

| 0357443 | 3/1990 | European Pat. Off. . |
| 0432930 | 6/1991 | European Pat. Off. . |
| 62-40518 | 3/1987 | Japan . |
| 62-124510 | 8/1987 | Japan . |
| 1171994 | 7/1989 | Japan . |
| 02-171994 | 7/1989 | Japan . |
| 01-213988 | 8/1989 | Japan . |
| 2260388 | 10/1990 | Japan . |
| 2177293 | 10/1990 | Japan . |

*Primary Examiner*—Ulysses Weldon
*Assistant Examiner*—Amare Mengistu
*Attorney, Agent, or Firm*—Lowe, Price, LeBlanc & Becker

[57] ABSTRACT

A display panel integrated with EL can be obtained by printing EL at the back of a light permeable substrate, and covering the front surface of the substrate and the rearface of EL with a moisture proof film for insulating and protecting the EL from the surrounding atmosphere. Alternatively, the film may cover the substrate and EL entirely. An indication mark is printed at the surface of the moisture proof film or the light permeable substrate. The light permeable front electrode, the light emission layer and the back electrode are successively printed to the rearface of the light permeable substrate. If the indication mark is printed on the surface of the substrate, the attenuation of decay of the light emission from the emission layer can be suppressed and the brightness of the display mark improved by not forming the insulation layer at the back of the substrate. Alternatively, by forming the insulation layer at the back of the substrate, the entire thickness and the weight of the display panel can be decreased and the production step simplified.

20 Claims, 4 Drawing Sheets

DISPLAY PANEL

BACKGROUND OF THE INVENTION

1. Field of the Invention

The present invention concerns a display panel in which an indication mark is illuminated by light emission from the rear face and, more in particular, it relates to a display panel suitable to use as a number plate for an indication instrument.

2. Description of the Prior Art

For instance, in an automobile indicator, indication marks such as scales or numerical figures printed on the front surface of a number plate can be seen clearly during night or in a dark circumstance. Specifically, a light permeable substrate is adopted for the number plate and it is formed such that an indication mark is in the form of negative indication (indication mark appears bright) or positive (opposite to the negative) indication and an illumination member comprising lamps is disposed at the back of the number plate (for example, refer to U.S. Pat. Nos. 4,878,387 and 5,047,761).

In the above-mentioned indicator, the brightness of the indication mark becomes not uniform depending on the difference in the distance from the illumination member and it is difficult to see. Further, in view of the heat generation from illumination member, an expensive heat resistant material has to be used for a casing containing the indicator. Further, since a gap has to be large between the illumination member and the casing in view of the heat generation from the illumination member, the size of the casing is enlarged.

As a countermeasure for overcoming such problems, an electroluminescent lamp panel (hereinafter referred to as "EL") is sometimes disposed at the back of the number plate (for example, refer to U.S. Pat. No. 5,036,249 and Japanese Utility Model Laid-Open Sho 62-40518 and Sho 62-124510).

The foregoing problems can be solved by adopting EL for the illumination of the number plate. However, when EL is at the back of the number plate, the position between EL and the number plate has to be aligned accurately for satisfactory illumination of the indication mark on the number plate by the EL emission. In addition, since EL is thin and easy to flex distort, EL has to be protected from the surrounding atmosphere such as external vibrations and a rigid rear frame has been attached at the back of EL for instance. Accordingly, assembling operation between the number plate and EL or the number plate, EL and the rear frame becomes to complicated to make the production troublesome.

An object of the present invention is to overcome the foregoing problem and provide a display panel integrated with EL and, particularly, a display panel suitable to use as a number plate for use in an indicator.

SUMMARY OF THE INVENTION

In the present invention, EL is printed at the back of a light permeable substrate, the front surface of the substrate and the rearface of the EL are covered with a moisture proof film for insulating and protecting EL from the surrounding atmosphere, or the substrate and EL are covered entirely and an indication mark is printed on the surface of the moisture proof film:

In the present invention, EL is printed on the rearface of a light permeable substrate having an indication mark printed on the surface thereof, the front surface of the substrate and the rearface of EL are covered with a moisture proof film for insulating and protecting EL from the surrounding atmosphere, or the substrate and EL are entirely covered.

In the present invention, a light permeable front electrode, a light emission layer and a back electrode are successively printed at the back of the light permeable substrate having an indication mark printed on the front surface, an insulation layer for insulating and protecting the front electrode, the light emission layer and the back electrode from the surrounding atmosphere is formed at the back of the substrate and, particularly, the insulation layer is formed by printing, for example by applying in liquid or powder form, an insulation material.

DETAILED DESCRIPTION OF THE PREFERRED EMBODIMENTS

Description will now be made to a display panel according to the present invention based on preferred embodiments used as a number plate for an indicator with reference to the accompanying drawings.

Figure 1:
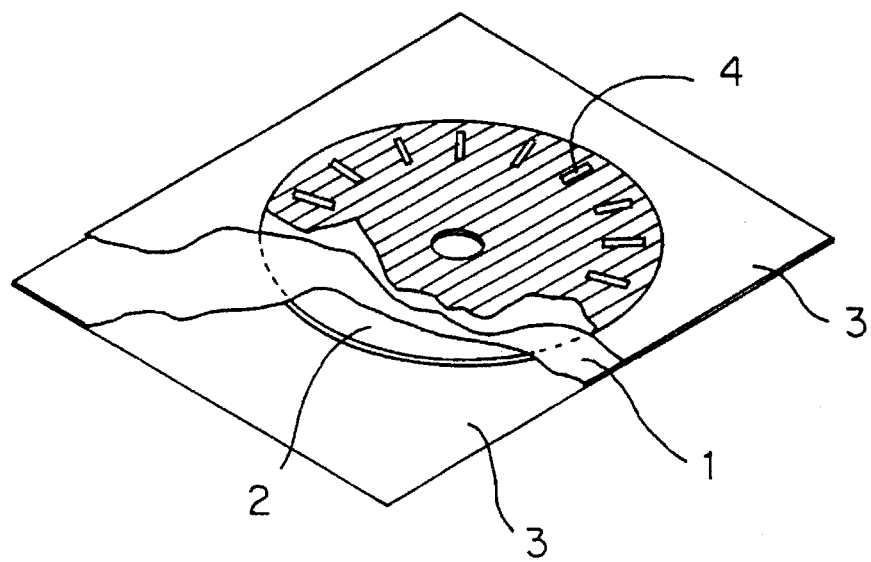
FIG. 1 is a perspective view partly cut away of a first embodiment according to the present invention.
Figure 2:
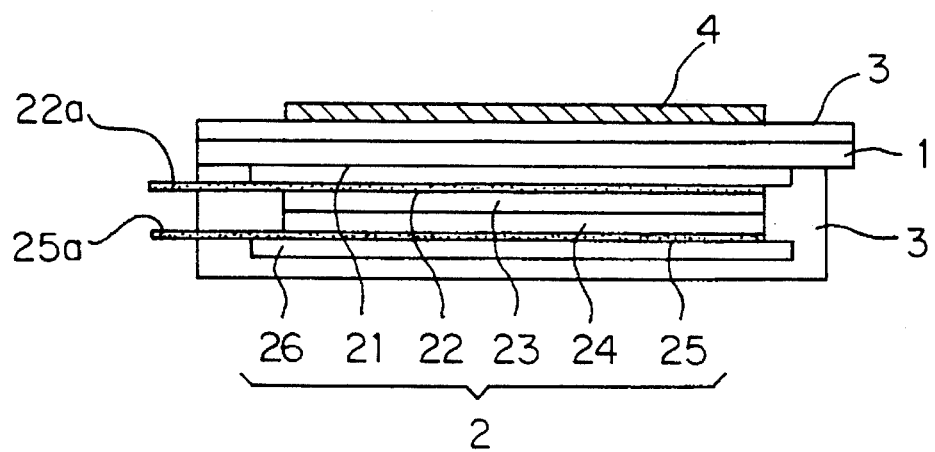
FIG. 2 is a cross sectional view for a portion of the embodiment described above.

FIGS. 1 and 2 show a first embodiment according to the present invention in which EL 2 is printed on the rear face of a light permeable substrate 1. EL 2 is formed by laminating, at the back of the substrate 1, a moisture absorbing layer (Sumicagel, nylon or the like) 21, a light permeable front electrode (coating type ITO) 22, a light emission layer 23, an insulation layer 24, a reflective back electrode (Ag foil) 25 and a moisture absorbing layer 26 successively. Then, the front surface of the substrate 1 and the rearface of EL 2 are covered with a moisture proof film 3 for insulating and protecting EL 2 from the surrounding atmosphere, terminals (leads) 22a, 25a for the electrodes 22, 25 are exposed to the outside of the moisture proof film 3, the periphery of the moisture proof film 3 is sealed, and an indication mark 4 in a negative display is printed at the front surface of the moisture film on the side of the front surface of the substrate 1.

Figure 3:
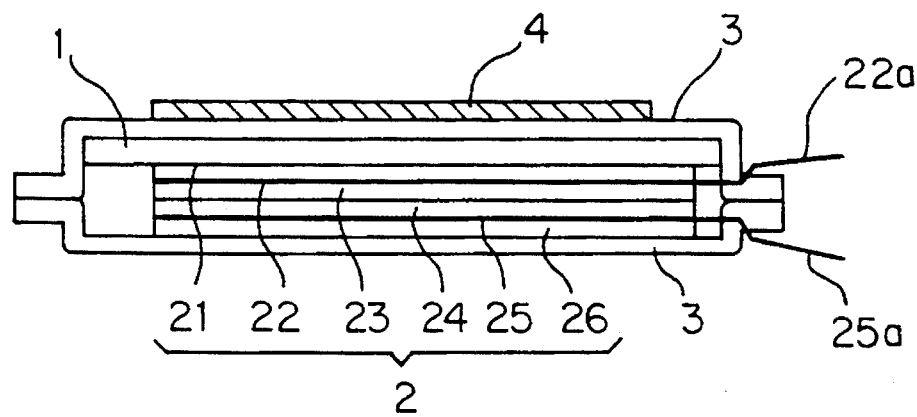
FIG. 3 is a cross sectional view for a portion of a second embodiment according to the present invention.

FIG. 3 shows a second embodiment of the present invention, in which the moisture proof film 3 in the first embodiment covers the substrate 1 and EL 2 entirely, and an indication mark 4 is printed on the surface of the moisture proof film 3.

Figure 4:
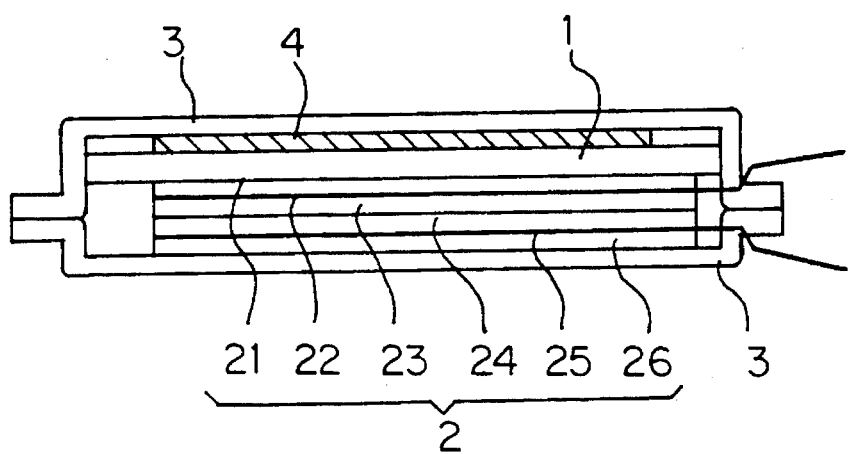
FIG. 4 is a cross sectional view for a portion of a third embodiment according to the present invention.

FIG. 4 shows a third embodiment according to the present invention, in which an indication mark 4 is previously printed to the front surface of the light permeable substrate 1, EL 2 of the same constitution as that in first or second embodiment is printed at the back of the substrate 1, and the substrate 1 and EL 2 are entirely covered by a moisture proof film 3 for insulating and protecting EL 2 from the surrounding atmosphere like that in the second embodiment. In the third embodiment, the moisture proof film 3 may cover the front surface of the substrate 1 and the rearface of EL 2 like that in the first embodiment.

According to the first to third embodiments, the light emission layer 23 emits light by application of a predetermined voltage to each of the terminals 22a, 25a for the electrodes 22, 25 and the light emission illuminates the indication mark 4 from the back.

Then, according to the first to third embodiments, a number plate integrated with EL 2 can be obtained. Accordingly, manufacture of the number plate can be simplified as compared with the prior art (manufacturing EL as an independent member, it is attached to a number plate).

Figure 5:
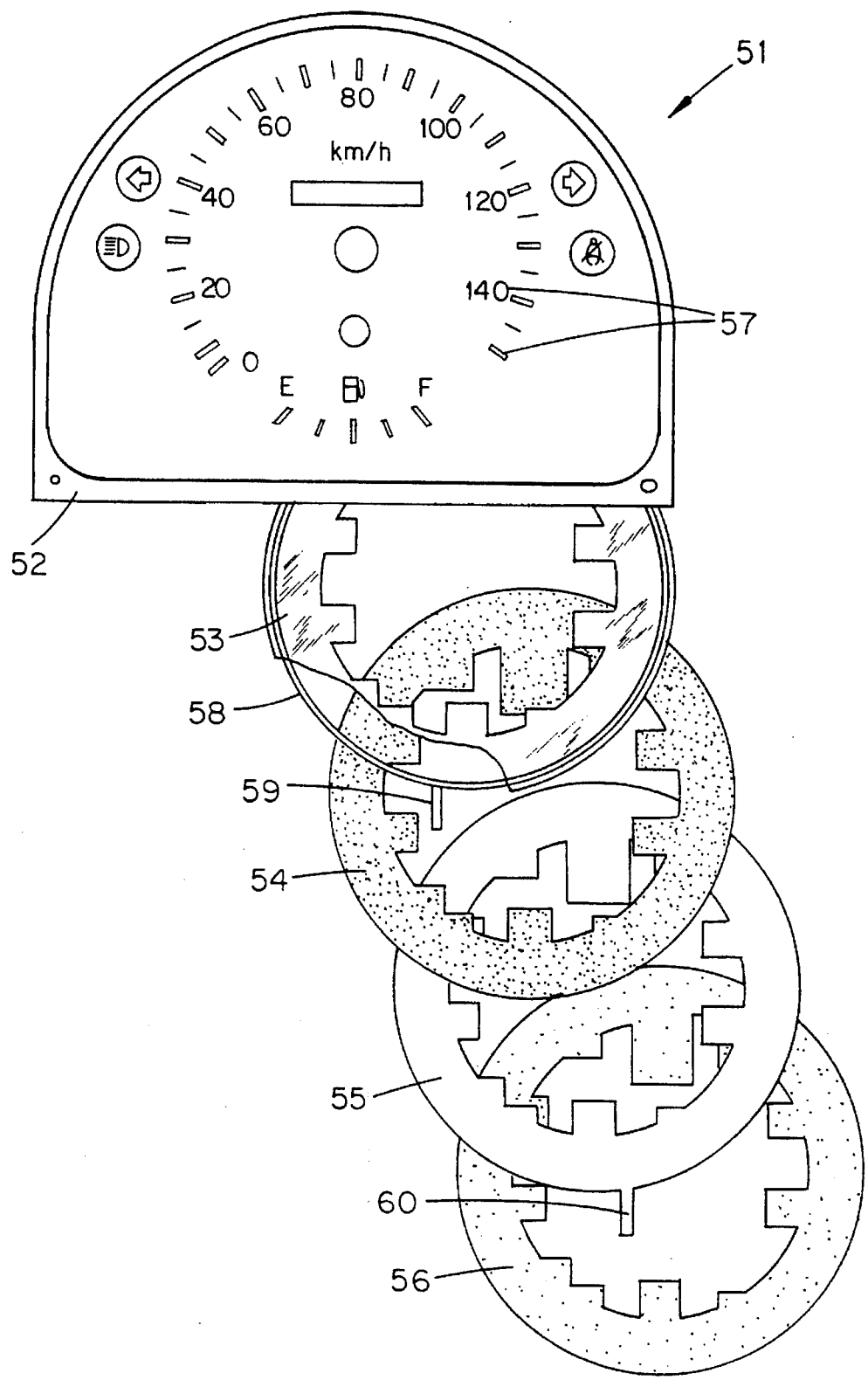
FIG. 5 is an exploded perspective view of a fourth embodiment according to the present invention.
Figure 6:
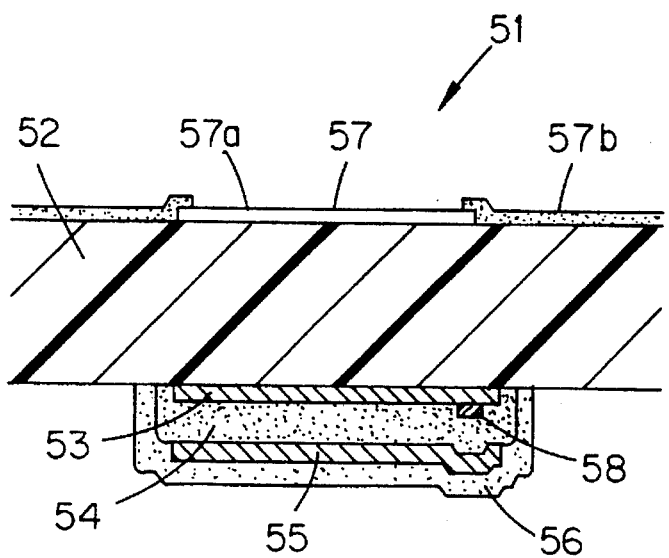
FIG. 6 is a cross sectional view for a portion of the embodiment described above.
Figure 7:
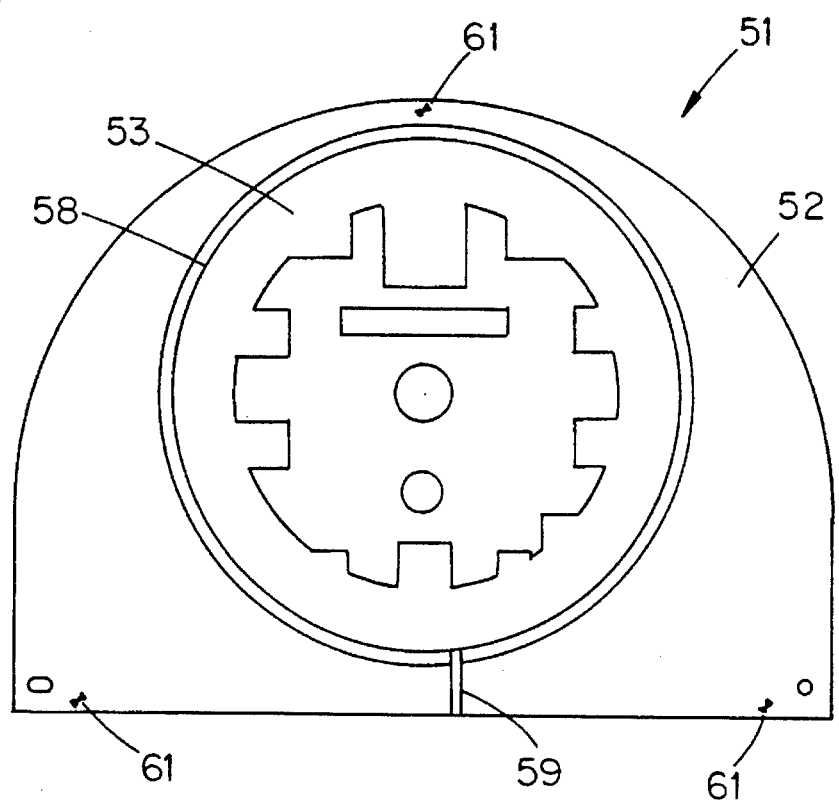
FIG. 7 is a back view in a state where a front electrode and a bus bar are formed to the substrate of the embodiment described above.

FIGS. 5, 6 and 7 show a fourth embodiment according to the present invention in which a number plate 51 is formed by successively printing, at the back of a light permeable substrate 52, a light permeable front electrode (coating type ITO) 53, a light emission layer 54, a back electrode 55 followed by drying and, further, forming an insulation layer and then printing and drying an indication mark 57 showing a running speed and fuel residue to the front surface of the substrate 52, in which an electrode 53, a light emission layer 54, an electrode 55 and an insulation layer 56 correspond to EL 2 (refer to FIGS. 1–4) of the first to third embodiments.

The substrate 52 is a panel (of about 1.5 mm thickness) made of a resin, for example, polycarbonate like that existent number plate for the indicator and, in a case of indicating an indication mark 57 in the negative form, it can be obtained by printing the indication mark 57 with a white or like other light permeable paint and printing other portion with a light impermeable paint of black or like other color and a positive indication is attained by opposite procedures. In this embodiment, a negative indication mark 57 is formed by the same printing means as for the existent number plate, by printing the indication mark 57 with a white paint 57a while painting other portion with a black paint 57b.

The front electrode 53 is formed by preparing a light permeable conductive material by kneading a metal oxide comprising indium oxide containing tin and adsorbing a dispersant composed of an anionic surface active agent and a binder resin comprising a vinyl acetate resin and adjusting a viscosity by a solvent comprising butyl cellosolve acetate and printing and drying the conductive material in a shape corresponding to the indication mark 57 (about 5 um thickness), a bus bar 58 comprising a low resistance material of a silver paste is formed by printing and drying so as not to oppose the indication mark 57 at the periphery of the front electrode 53, and a portion of a bus bar 58 is led to the end at the back of the substrate 52 as a terminal 59 (about 5 um thickness).

The light emission layer 54 is formed by using a fluorescent paste prepared by dispersing a fluorescent material comprising a matrix of zinc sulfide mixed with a copper activator and, as required, a chlorine activator into a thermosetting epoxy resin of low water absorption and printing and drying the same substantially in the same shape (identical or somewhat greater) of the electrode 53 (about 40 um thickness).

The back electrode 55 is formed by printing and drying a reflecting conductive material of a silver paste so as to oppose to the front electrode 53 by way of a light emission layer 54 followed by drying, and a portion of the back electrode 55 is led out to the end of the rearface of the substrate 52 as a terminal 60 (about 10 um thickness). Then, the light emission layer 54 emits light by applying a predetermined voltage between terminals 59 and 60, that is, between electrodes 53 and 55 and the light illuminates the indication mark 57 at the back. It will be apparent that the electrodes 53, 55 and the terminals 59 and 60 have to be designed and formed with such a care as not causing short circuit between each of them.

An insulation layer 56 serves to insulate and protect the front electrode 53, the emission layer 54 and the back electrode 55 from the surrounding atmosphere such as moisture or impact shock, which can be formed by appending a high molecular weight insulation material such as a thin nylon sheet or a polyethylene naphthalate film to the back of the substrate 52, excepting for the terminals 59, 60. As shown in FIGS. 5 and 6, if a thermosetting polymeric material such as an epoxy resin incorporated with a spacer material of glass beads is formed by printing (for example, by applying in liquid form) and drying as an insulation material (about 15 um thickness), the entire thickness and the weight of the number plate can be reduced than in the case of using the insulation material and the entire portion including the front electrode 53 and the insulation layer 56 can be formed by printing and, accordingly, the production step can be simplified more than in the case of using the insulation material. As shown in FIG. 6, the light permeable front electrode 53 is formed to be in contact with a portion of the surface of the back of the light permeable substrate 52. The insulating layer 56 entirely covers the side surfaces of the light permeable front electrode 53, light emission layer 54 and back electrode 55, as well as the back surface of the back electrode 55. The insulating layer 56 is also in contact with a portion of the surface of the back of the light permeable substrate 52 which is outside the back surface portion of the substrate 52 which is in contact with the front electrode 53.

Although not illustrated, it will be effective for improving the light emission performance of the light emission layer 54, if necessary, to interpose a dielectric layer (corresponding to insulation layer 24 in the first to third embodiments shown in FIGS. 1–4) between the electrodes 53 and 55. Such a dielectric layer is formed by printing a dielectric paste prepared by dispersing a dielectric material of barium titanate in an thermosetting epoxy resin of low water absorption and drying the same (about 40 um thickness).

Reference numeral 61 in FIG. 7 denotes an alignment mark printed simultaneously upon printing the front electrode 53 with the identical material and it is disposed at the back of the substrate 52 not opposing to the indication mark 57, and the indication mark 57 is formed to the front surface of the substrate 52 by aligning a printing mask (not illustrated) having a pattern for the indication mark 57 as a reference.

Further, an indication member situating at the back of the number plate 51 can be illuminated by making the front electrode 53—back electrode 55 greater than the indication mark 57 and making the back electrode 55 light permeable.

A number plate having the foregoing constitution is disposed on an indicator not illustrated and the terminals 59 and 60 are connected by way of a switch (not illustrated) to a driving circuit (not illustrated). Then, when the switch is turned ON during night or in a dark circumstance, the light emission layer 54 emits light to illuminate the indication mark 57 brightly.

In the fourth embodiment, a number plate integrated with EL can be obtained. Accordingly, manufacture can be simplified as compared with the prior art in which EL was manufactured as an independent member.

Further, since the front electrode 53 and the subsequent members are formed at the back of the substrate 52 for the number plate 51, it is possible to improve the emission efficiency while suppressing the decay of emission from the emission layer 54 and improve the brightness of the indication mark 57 under the application of an identical voltage as compared with the case of the first to third embodiments.

Further, when the insulation layer 56 for insulating an protecting the front electrode 53, the light emission layer 54 and the back electrode 55 from the surrounding atmosphere is printed (for example, by applying in liquid form) at the back of the substrate 52 of the insulation layer 56, the entire thickness and the weight of tile number plate 51 can be reduced and the entire portion including the front electrode 53 as far as the insulation layer 56 can be formed by printing and, accordingly, the manufacturing step can be simplified.

The present invention is also applicable, in addition to each of the above-mentioned embodiments, to display members such as a guide plate indicating an emergency exit and a decorative sign board. Further, it will be apparent that the materials used can be selected variously and the color of light emission can optionally be selected depending on the material of the light emission layers 23, 54.

Furthermore, if the back electrode 25, 55 are made of the same light permeable material as that for the front electrodes 22, 53, light emitted from the light emission layers 28, 54 are illuminated also to the backward and, for instance, an integrating meter (not illustrated) can also be illuminated.

In the present invention including each of the foregoing embodiments, various appropriate printing methods can be adopted for "printing" such as a screen printing method and it also includes a film coating method such as roll coating.

What is claimed is:

1. A display panel comprising:

a light permeable substrate having an indication mark on the surface thereof; and a light permeable front electrode, a light emission layer, a back electrode and an insulating layer successively formed at the back of the light permeable substrate; wherein (i) the light permeable front electrode, the light emission layer, the back electrode and the insulating layer are formed by screen printing and (ii) the insulating layer insulates said front electrode, said light emission layer and said back electrode from the surrounding atmosphere.

2. A display panel according to claim 1, wherein the light permeable front electrode is in a shape corresponding to an indication mark.

3. A display panel according to claim 2, wherein said light emission layer has substantially the same shape as the light permeable front electrode.

4. A display panel according to claim 1, wherein the insulating layer is formed by applying an insulating material in liquid form.

5. A display panel according to claim 1, wherein the insulating layer is formed so as to cover surfaces of the light permeable front electrode, the light emission layer, and the back electrode and a back surface of the back electrode.

6. A display panel according to claim 1, wherein the indication mark is formed by screen printing.

7. A display panel according to claim 1, wherein the insulating layer is moisture proof.

8. A display panel comprising:

a light permeable substrate having an indication mark on the surface thereof; and a light permeable front electrode, a light emission layer, a back electrode and an insulating layer successively formed at the back of the light permeable substrate; wherein:

the light permeable front electrode, the light emission layer, the back electrode and the insulating layer are formed by screen printing;

the back of the light permeable substrate has a first surface portion and a second surface portion, and the light permeable front electrode is formed to be in contact with only the first surface portion; and the insulating layer insulates said front electrode, said light emission layer and said back electrode from the surrounding atmosphere and is formed so as (i) to entirely cover side surfaces of the light permeable front electrode, the light emission layer, and the back electrode and a back surface of the back electrode, and (ii) to be in contact with only the second surface portion of the back of the light permeable substrate.

9. A display panel according to claim 8, wherein the light permeable front electrode is in a shape corresponding to an indication mark.

10. A display panel according to claim 9, wherein said light emission layer has substantially the same shape as the light permeable front electrode.

11. A display panel according to claim 8, wherein the insulating layer is formed by applying an insulating material in liquid form.

12. A display panel according to claim 8, wherein the indication mark is formed by screen printing.

13. A display panel according to claim 8, wherein the insulating layer is moisture proof.

14. A display panel comprising:

a light permeable substrate having an indication mark on the surface thereof; and a light permeable front electrode, a light emission layer, a back electrode and an insulating layer formed at the back of the light permeable substrate;

wherein the back of the light permeable substrate has a first surface portion and a second surface portion, and the light permeable front electrode is formed to be in contact with only the first surface portion and the insulating layer is formed to be in contact with only the second surface portion of the back of the light permeable substrate.

15. A display panel according to claim 14, wherein said light permeable front electrode and said light emission layer are substantially in a shape corresponding to the indication mark.

16. A display panel according to claim 14, wherein the insulating layer is formed by applying an insulating material in liquid form.

17. A display panel according to claim 14, wherein the indication mark is formed by screen printing.

18. A display panel according to claim 14, wherein the insulating layer is moisture proof.

19. A display panel according to claim 14, wherein the light permeable front electrode, the light emission layer, the back electrode and the insulating layer are successively formed by screen printing.

20. A display panel according to claim 14, wherein the insulating layer is formed to entirely cover side surfaces of the light permeable front electrode, the light emission layer, and the back electrode and a back surface of the back electrode and insulates said front electrode, said light emission layer and said back electrode from the surrounding atmosphere.

* * * * *